Oct. 25, 1955    G. K. NEWELL    2,721,769
WEIGHING MECHANISM FOR LOAD COMPENSATING BRAKE
Filed Dec. 27, 1951    2 Sheets-Sheet 2
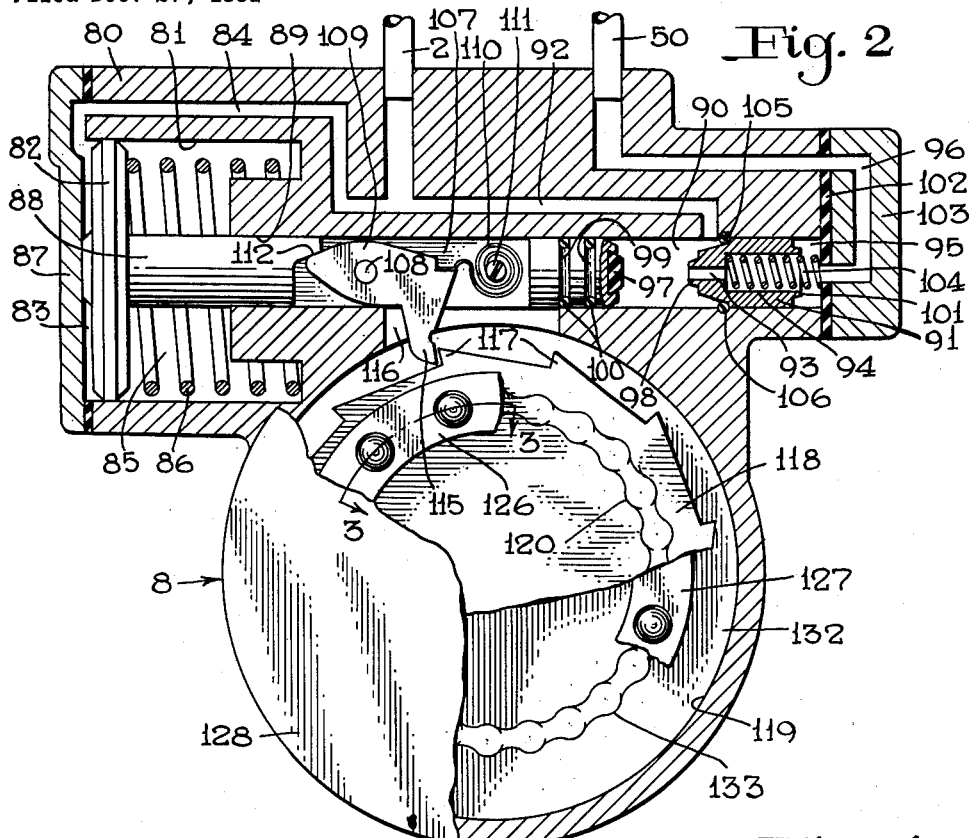
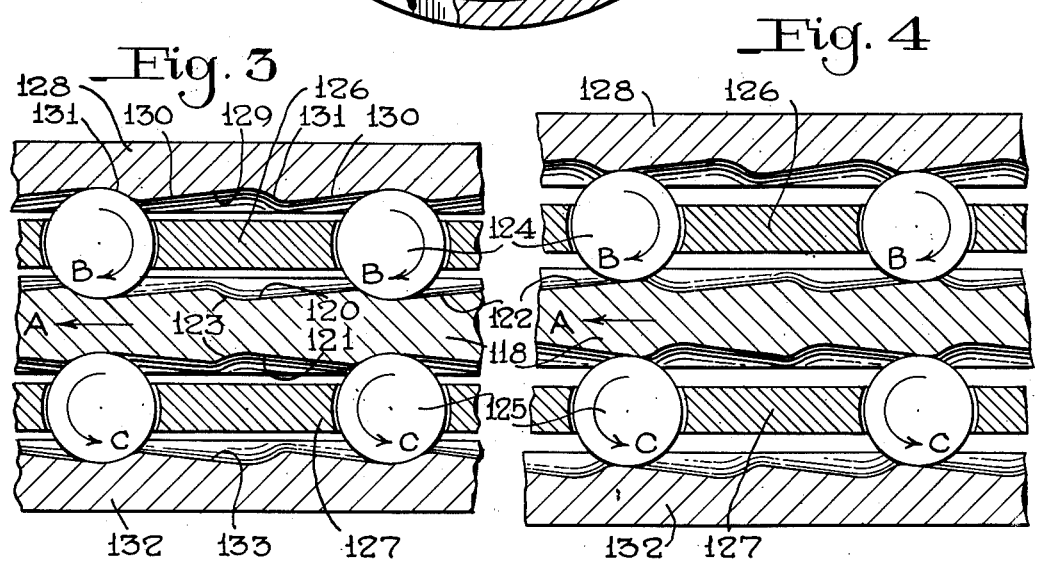
INVENTOR.
*George K. Newell*
BY
*Adelbert A. Steinmiller*
ATTORNEY

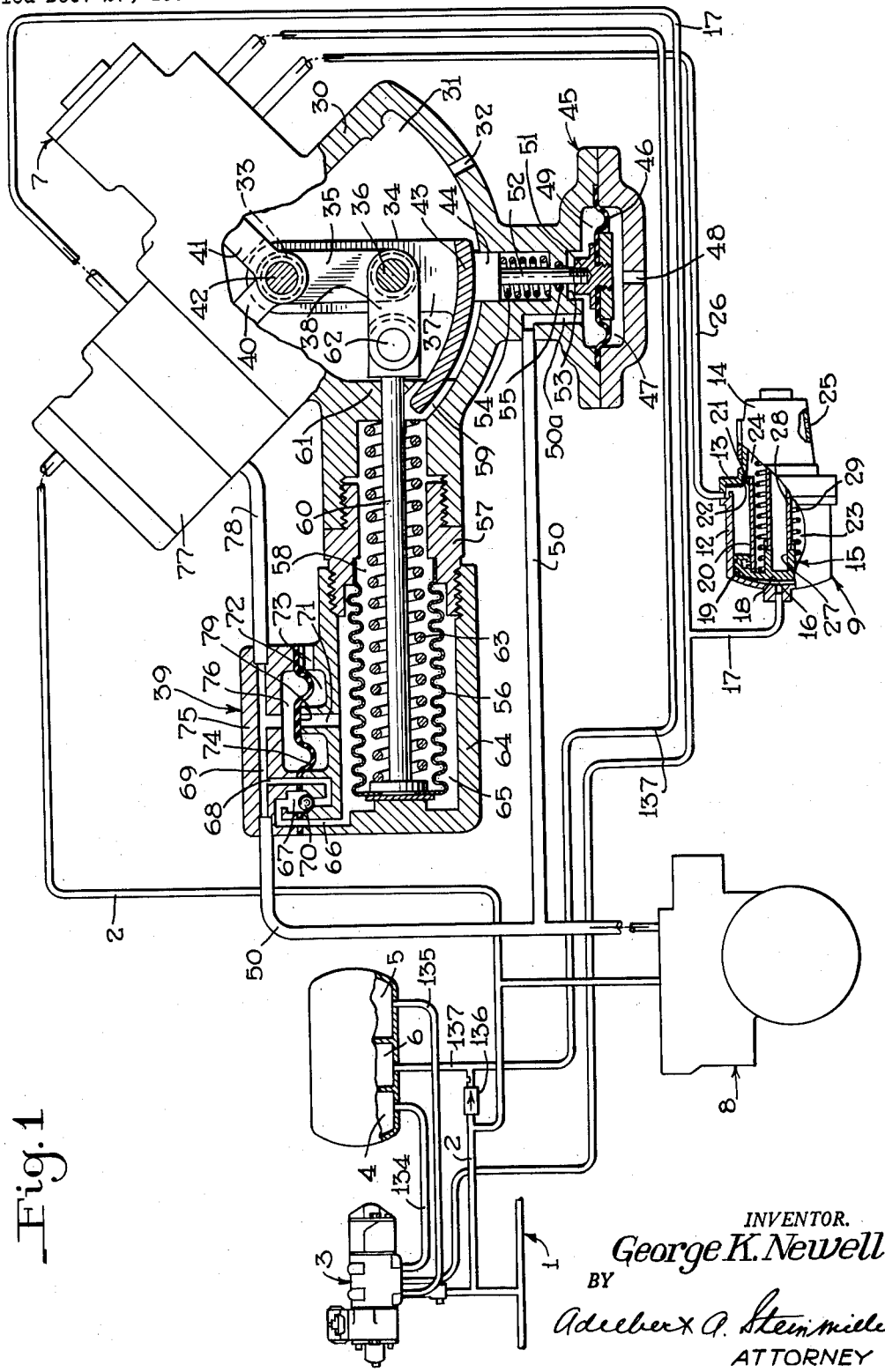

United States Patent Office 2,721,769
Patented Oct. 25, 1955

2,721,769

WEIGHING MECHANISM FOR LOAD COMPENSATING BRAKE

George K. Newell, Level Green, Penn Township, Westmoreland County, Pa., assignor to Westinghouse Air Brake Company, Wilmerding, Pa., a corporation of Pennsylvania Application December 27, 1951, Serial No. 263,622

3 Claims. (Cl. 303—22)

This invention relates to load compensating fluid pressure brake equipment for railway vehicles and more particularly to a weighing mechanism for such a brake equipment.

The principal object of this invention is to provide an improved weighing mechanism which makes a direct reading, or registration, of the weight of the load supported by the vehicle or car trucks, regardless of the condition of the truck springs or the horizontal or vertical position of the car body relative to the trucks.

Another object is to provide a weighing mechanism of the above type which is capable of being mounted on a wide variety of modern railway vehicles without the necessity of individual adjustment for each car installation.

Other objects and advantages will appear in the following more detailed description of the invention taken in connection with the accompanying drawings wherein Fig. 1 is a diagrammatic view, partly in outline and partly in section, of a fluid pressure brake equipment comprising a load weighing mechanism embodying the invention and associated with a load compensating valve device; Fig. 2 is an enlarged sectional view of the load measuring mechanism shown in Fig. 1; Fig. 3 is a sectional view taken on lines 3—3 of Fig. 2; and, Fig. 4 is a similar view of the several parts shown in Fig. 3 disposed in operative positions.

Description

In the drawings, the weighing mechanism, constructed in accordance with the invention, is shown associated with a load compensating valve device in a railway vehicle load compensating, or variable load, brake equipment of the type shown and described in my co-pending application, Serial No. 261,895, filed December 15, 1951.

The vehicle body may be of the passenger, freight, or tender type and the trucks for carrying the same may each be of any desired construction and, since these parts are not essential to a clear understanding of the invention, they are not shown in the drawings. As shown in Fig. 1 of the drawings, the load compensating fluid pressure brake equipment may comprise the usual brake pipe indicated by the reference numeral 1, a branch pipe 2, a brake controlling valve device 3, an auxiliary reservoir 4, an emergency reservoir 5, a supplementary reservoir 6, a load compensating valve device 7, a weighing mechanism 8, and a load compensating brake cylinder device 9.

The brake controlling valve device 3 may be of substantially the same construction and have the same operating characteristics as the "AB" valve device shown and described in the patent to Clyde C. Farmer, No. 2,031,213, issued February 18, 1936, in view of which is is deemed unnecessary to show and describe this device in detail. It will, of course, be understood that this device operates upon a service reduction in brake pipe pressure to supply fluid under pressure to effect a service application of brakes, upon an emergency reduction in brake pipe pressure to effect an emergency application of brakes, and upon an increase in brake pipe pressure to effect a release of brakes and charging of the brake equipment.

It is preferred for this invention that the weighing mechanism of the embodiment be disposed between a load equalizer of the usual type and a journal box of a truck, or, in trucks without equalizers, under one or more of the supporting coil springs, and thus be subject to and register with only a proportionate part of the load.

The brake cylinder device 9 comprises a hollow cup-shaped casing 12 to the open end of which is secured an annular pressure head 13 from which projects a hollow cup-shaped non-pressure head 14. A brake cylinder piston 15 is slidably mounted in the casing 12 and at one side thereof is the usual or main pressure chamber 16 to which is connected a brake cylinder pipe 17.

The brake cylinder piston 15 comprises a piston head 18 to one face of which is connected a flexible packing cup 19 for preventing leakage of fluid under pressure from pressure chamber 16 to the opposite side of the piston. Secured at one end and projecting from piston 15 in a direction away from the pressure chamber 16 is a hollow stem 20, the opposite end of which is slidably mounted in a ring 21 secured in the pressure head 13. Carried by the pressure head 13 and ring 21 is a packing cup, or sealing ring 22, having sealing and sliding contact with the outer peripheral surface of the stem 20 for preventing leakage of fluid under pressure from a compensating chamber 23, formed around said stem between the pressure head 13 and the piston 15, to a non-pressure chamber 24 formed within said stem and open to the interior of the non-pressure head 14 and thence to atmosphere through a port 25 in said non-pressure head. The pressure chamber 23 is open to a pipe 26, through which fluid under pressure is adapted to be supplied to and released from said chamber by operation of the load compensating valve device 7, in a manner which will be hereinafter described.

The brake cylinder piston head 18 is provided with a hollow boss 27 projecting into the hollow stem 20 in coaxial relation to said head and stem, and one end of a hollow rod 28 is secured in said boss. The rod 28 extends through the non-pressure head 14 to the exterior thereof, said rod being hollow to accommodate the usual push rod (not shown) for connecting the brake cylinder piston 15 to the brake rigging (not shown) of a car in a conventional manner. Encircling the hollow rod 28 is a brake cylinder piston release spring 29 one end of which bears against the piston head 19 for moving the brake cylinder piston to its brake release position, in which it is shown in the drawing. The opposite end of the release spring 29 is supported on the non-pressure head 14.

The load compensating valve device 7 is adapted to deliver fluid to the load compensating, or counter-pressure, chamber 23 in the brake cylinder device 9 at pressures which are varied directly according to the pressure of fluid in main pressure chamber 16 and brake cylinder pipe 17, and inversely according to the load on the vehicle. The pressures of fluid to be delivered to the counter-pressure chamber 23 are balanced against and varied with those in a control chamber (not shown) connected to the brake cylinder pipe 17, the proportion being determined by a fluid pressure responsive mechanism which varies the angle of thrust exerted by the control pressure according to the variations in pressure of fluid delivered from the load weighing mechanism 8 as determined by the load carried by the vehicle, as will be described more fully later.

The load compensating valve device 7 comprises a casing 30 having a chamber 31 which is open to atmosphere through a port 32. Disposed in chamber 31 and journaled at its upper end in casing 30 by means of a pair of stub shafts 33 is a U-shaped yoke member 34 which, intermediate its ends, pivotally supports in turn a pair of struts 35 by means of a shaft 36. The shaft 36 extends through upright sides 37 of the U-shaped yoke member 34 the lower ends of struts 35 being disposed inwardly of the yoke member with one end of a substantially horizontal link 38 being disposed between the struts for operative connection with an actuating portion 39 to be described in detail later.

The struts 35 normally extend vertically from the above described connection with their median lines in planar alignment with the median line of the yoke member 34, making at their upper ends a pivotal connection with a control stem 40 and a balancing stem 41 by means of a pin 42 extending therethrough, said stems being disposed between said struts.

The lower end of the yoke member is provided with an arcuate friction shoe 43 which may be frictionally engaged by detent 44 of a locking portion 45.

The locking portion 45 constitutes a part of the load compensating valve device 7 and operates in response to pressure of fluid in a weighing pipe 50 to actuate the detent 44 out of frictional engagement with the shoe portion 43 of the yoke member 34. The locking portion 45 comprises a diaphragm 46 clamped around its peripheral edge between two sections of casing 30, said diaphragm having at one side a chamber 47 constantly open to atmosphere through a port 48 in said casing and at the other side a chamber 49 constantly connected to weighing pipe 50 through a passage 50a. Secured to the center of diaphragm 46 by means of a screw-threaded nut 51 is a stem 52 formed integral with the detent 44 and extending through a casing wall 53 between chambers 47 and 31. A spring 54 is interposed between the wall 53 and detent 44, which urges said detent toward its normal position in contact with shoe portion 43. An annular sealing ring 55 is mounted in a suitable groove in the wall 53 so as to encircle and sealingly engage the stem 52 and said wall and thereby prevent leakage of fluid under pressure from chamber 49 to atmosphere by way of chamber 31 and port 32.

The actuating portion 39 also constitutes a part of the load compensating valve device 7 and is provided for the purpose of operating through the medium of the link 38 to rock the yoke member 34 about the stub shafts 33. This actuating portion 39 comprises an elongated hollow or cup-shaped bellows diaphragm 56 bonded about its edge at the open end to a nipple portion 57 screwed into a portion of casing 30, thereby defining a chamber 58 which is connected to atmospheric chamber 31 through an opening 59 in said casing. Contained in chamber 58 and abutting the inside of the outer end wall of diaphragm 56 is a follower and stem 60, which extends through a suitable opening in a wall 61 of casing 30 and makes a pivotal connection with one end of the link 38 by means of a pin 62, which link is pivotally connected at the other end to pin 36. A spring 63 contained in chamber 58 urges follower 60 toward the position in which it is shown in Fig. 1 of the drawings.

The actuating mechanism 39 further comprises a closure portion 64 which makes screw-threaded connection with the nipple portion 57, thereby defining a chamber 65 which is connected through a passage 66 to a chamber 67, which may be connected through passages 68 and 69 to the weighing pipe 50. The chamber 67 contains a ball check valve 70 which permits flow of fluid under pressure only in a direction away from weighing pipe 50 to chamber 67.

The chamber 65 is also open to a passage 71 leading to a chamber 72 which is constantly open to atmosphere through a port 73. The chamber 72 is defined in part by a valved diaphragm 74, secured at its periphery between closure portion 64 and a cap portion 75 and having at its opposite side a chamber 76 open to passage 69 which is constantly connected to passage 68 leading in one direction to weighing pipe 50, and in the opposite direction to a cut-off valve device 77 through a pipe 78. The diaphragm 74 is adapted to respond to a preponderance of fluid in chamber 76 to sealingly engage a valve seat 79 encircling the mouth of passage 71 in chamber 72.

As shown in Fig. 2, the weighing mechanism 8 may comprise a sectional casing 80 having a bore 81 therein, in which is operatively mounted a piston 82. At one side of piston 82 is a chamber 83, which is constantly connected to branch pipe 2 through a passage 84, and at the other side of piston 82 is a chamber 85 containing a spring 86 which constantly urges piston 82 toward the left, as viewed in Fig. 2, into contact with a cover portion 87 forming a part of casing 80 and closing the outer end of bore 81.

The piston 82 is provided at its inner face with a stem 88 which extends across chamber 85 and is slidably mounted in a reduced portion 89 of the bore 81. A chamber 90 is defined in bore 89 by the inner end of piston stem 88 at one end and at the opposite end by an annular seat member 91 which chamber is connected through one branch 92 of a passage 84 to branch pipe 2. Chamber 90 may also be connected through a passage 93 and connected coaxial bore 94 in said seat member to a chamber 95, which latter chamber may be connected to a passage 96 leading to the weighing pipe 50.

The inner, or right-hand end, of stem 88, as viewed in Fig. 2, is tipped with an annular valve 97, formed of rubber or similar suitable composition material, which is arranged to contact or engage a valve seat 98, formed on the valve seat member 91, upon a sufficient degree of movement of piston 82 in an inward direction. Adjacent the valve 97, the piston stem 88 is provided with a pair of spaced annular grooves 99 for receiving a pair of annular sealing rings 100 for the purpose of preventing leakage of fluid under pressure through bore 89 from chamber 90.

The valve seat member 91 is slidably mounted in bore 89 adjacent its right-hand end and, in addition to the previously mentioned valve seat 98 at its left-hand end, is provided at its right-hand end with a valve seat 101 for sealing engagement with a sealing gasket 102 secured between a cover portion 103 by any suitable means (not shown) and the casing 80. Contained in chamber 95 and bore 94 is a spring 104 which operatively engages the gasket 102 so as to constantly urge the valve seat member 91 in a direction towards the left hand as viewed in Fig. 2. Movement of the valve seat member 91 toward the left is limited by a retaining ring 105 expanded into a suitable groove 106 in the wall of the bore 89.

Intermediate its ends the stem 88 is provided with a slotted opening 107 extending vertically through said stem and having rockably mounted therein by means of a pin 108 a pawl 109. A torsion spring 110 is secured at one end in opening 107 by means of a screw 111 and at the other end operatively engages the pawl 109 so as to tend to rock said pawl in a clockwise direction about pin 108. Movement in this direction is limited, however, by contact of pawl 109 with a shoulder stop 112 formed in the left-hand end wall of the opening 107, as viewed in Fig. 2.

The pawl 109 is provided with a catch, or detent, 115 which projects through an opening 116 in a wall of the bore 90 for operative engagement with one of a plurality of teeth 117 formed on a circular rotary rack 118 rotatably mounted in a cylindrical bore 119 formed in an integral portion of the casing 80 with its axis spaced radially away from and at right angles to the bore 89. As shown in Figs. 3 and 4, the rotary rack 118 is provided at top and bottom with grooved surfaces 120 and 121, respectively, composed of a series of acclivities 122 marked off by interstices or indentations or abrupt declivities 123 occurring with the same regularity on each surface.

These grooved surfaces 120 and 121 are adapted to be traversed by two sets of ball bearings 124 and 125, respectively, spaced apart by spacers or races 126 and 127, respectively, a distance corresponding to the distance between two teeth 117. A plate 128, upon which a truck spring (not shown) may rest for measuring a fraction of the load carried by the vehicle, is provided with a groove 129 identical in contour with grooves 120 and 121 but displaced angularly relative to rack 118 so that as a ball bearing 124 is rotated in the direction of the arrow B by movement of the rotary rack 118 in the direction of arrow A and ascends one of acclivities 122 formed in surface 120, it likewise ascends an acclivity 130 formed in the bottom groove 129 of the plate 128. When a ball bearing 124 settles into one of declivities 123, it likewise settles into an indentation 131 in surfaces 129. A plate 132, which may rest upon a spring plank or truck bolster (not shown) has a correspondingly similar but oppositely formed groove 133 which is a counterpart of grooved surface 129 on plate 128 and is arranged to contact the bottom surface of ball bearings 125 in a relationship similar to that between plate 128 and bearings 124.

*Operation*

In operation, let it be assumed that the brake equipment is devoid of fluid under pressure and that the vehicle is empty and the various parts of the brake equipment are in the positions in which they are shown in the drawings. When it is desired to condition the brake equipment for operation, fluid under pressure is supplied to brake pipe 1 in the usual manner, whence it flows through branch pipe 2 to the brake controlling valve device 3, which operates in response thereto to supply fluid under pressure through pipes 134 and 135 to the auxiliary reservoir 4 and the emergency reservoir 5, respectively. Fluid under pressure supplied to branch pipe 2 also flows to supply reservoir 6 by way of a check valve 136 and pipe 137 to cut-off valve device 77 and to the weighing mechanism 8.

Fluid under pressure supplied to weighing mechanism 8 flows through passage 92 to chamber 90, whence it flows past valve seat 98, through passage 93 and bore 94 in valve seat member 91 to chamber 95, and thence through passage 96 to weighing pipe 50.

Fluid under pressure thus supplied to weighing pipe 50 flows through passage 50a to chamber 49 in the locking portion 45 where it exerts a downward force on diaphragm 46. When the pressure of fluid thus supplied to locking chamber 49 is increased to a chosen degree, such as ten pounds, for example, which is sufficient to overcome the opposing force of spring 54, diaphragm 46 deflects against said spring and, through the medium of follower 51 and stem 52, actuates the detent 44 out of frictional engagement with shoe portion 43 of the yoke member 34, thereby leaving the yoke member 34 free to be rocked about the stub shafts 33.

At the same time, fluid under pressure supplied from branch pipe 2 through weighing mechanism 8 to weighing pipe 50 also flows through passages 69 and 68, past ball check valve 70 into check valve chamber 67, whence it flows through passage 66 to chamber 65 in the actuating portion 39 of the load compensating valve device 7. At the same time, the connection of chamber 65 to atmosphere by way of passage 71, valve seat 79, chamber 72 and port 73 is closed off by the pressure of fluid supplied from passage 69 to chamber 76 acting on diaphragm 74 to hold said diaphragm in sealing engagement with valve seat 79. As the pressure of fluid in chamber 65 acting on diaphragm 56 increases enough to compress spring 63, diaphragm 56 deflects inwardly, causing, through the medium of follower and stem 60, pin 62, link 38 and pin 36, the yoke member 34 to rock in a counter-clockwise direction about stub shafts 33.

Now, while fluid under pressure is flowing from branch pipe 2 through weighing mechanism 8 to chamber 65 as just described, fluid under pressure also flows from branch pipe 2 through passage 84 to the face of piston 82 in chamber 83 and as the fluid pressure in chamber 65 increases, the fluid pressure in chamber 83 increases a like degree. When the fluid pressure in chamber 83 acting on piston 82 becomes sufficient to overcome the opposing pressure of spring 86, said piston moves to the right, as viewed in Fig. 2, carrying the detent 115 of the pawl 112 into contact with a tooth 117 of the rack 118. As will appear in the following, if the vehicle is partially or fully loaded, continued movement of the pawl 112 and piston 82 is opposed or resisted by the rotary rack 118.

Referring now to Figs. 3 and 4, it will readily be seen that the degree of force exerted on the rack 118 in the direction of the arrow A to roll ball bearings 124 along the acclivities 122 in the grooved surface 120 of the rack 118 and the acclivities 130 in the grooved surface 129 of the plate 128 is directly proportional, to the downward force exerted by the plate 128 in response to the weight of the load on the vehicle. In other words, when the ball bearings 124 are rolled in the direction of the arrow B from the declivities 131 and 123 to the peak of the acclivities 130 and 122, respectively, the plate 128 will have been displaced vertically away from the rack a distance equal to the elevation of the acclivities 130 plus that of the acclivities 122, as shown in Fig. 4. As the ball bearings 125 are rolled in the direction of the arrow C along the grooved surfaces 121 and 133 by the action of rack 118, the rack will have been displaced vertically away from the bottom plate 132 a distance equal to that between the rack and the upper plate 128 just described. Since the bottom plate 132 is supported on a vertically stationary portion of the vehicle, it is necessary to exert a force on the rack 118 sufficient to displace the upper plate 128 upwardly a distance equal to four times the height of any one of the acclivities such as shown in Figs. 3 and 4 in order to rotate the rack the distance of one tooth 117. It necessarily follows that for any degree of increase in the force acting downwardly on plate 128 there will have to be a corresponding increase in the degree of force exerted on rack 118 by the piston 83 before the rack can be rotated.

When the pressure of fluid in chamber 83 increases to a degree sufficient to overcome the opposing force of spring 86 plus that of the plate 128 acting on the attached pawl 116 through the means described in the preceding paragraph, piston 82 will move in response thereto from the position in which it is shown in Fig. 2 toward its extreme right-hand position. During this movement, valve 97 which is carried on the inner end of the piston stem 88, comes into sealing engagement with valve seat 98, thereby cutting off the flow of fluid under pressure from branch pipe 2 to weighing pipe 50. With the supply of fluid under pressure to chamber 65 cut off there will be no further counter-clockwise rocking of the yoke member 34 by the diaphragm 56 in valve device 7 (Fig. 1) acting against the spring 83 in response to increasing fluid pressure. Movement of piston 82 will continue to the right until stopped by the contact of valve seat 101 on the right-hand end of valve seat member 91 with the sealing gasket 102.

By the sealing engagement between valve seat 101 and gasket 102 leakage of fluid under pressure from chamber 90 through bore 89 past valve seat member 91 to passage 96 and weighing pipe 50 is prevented as the pressure of fluid in chamber 90 continues to rise with the charging of the equipment.

At a predetermined degree of pressure of fluid in brake pipe 1 the cut-off valve device 77 acts in response to pressure of fluid connected thereto by branch pipe 2 to vent fluid under pressure in pipe 78 to atmosphere in the manner fully described in the aforementioned copending application. Fluid under pressure in chamber 49 likewise flows to atmosphere through passage 50a, pipe 50, passage 69, pipe 78 and cut-off valve device 77. When the pressure of fluid in chamber 49 is reduced to a selected degree (10 pounds), spring 54 moves detent 44 into locking frictional engagement with shoe 43, locking the yoke member 34 in its newly assumed load-adjusted position.

Fluid under pressure in chamber 76 likewise flows to atmosphere through passage 69, pipe 78 and valve device 7 until pressure in said chamber is reduced sufficiently less than that of fluid bottled in chamber 65 by check valve 70 to permit unseating of diaphragm 74 and the flow of fluid under pressure in chamber 65 to atmosphere by way of passage 71, valve seat 79, chamber 72 and port 73.

From the foregoing it will be understood that if the car or vehicle is fully loaded, sufficient fluid under pressure will be supplied to chamber 65 in valve device 8 to rock the yoke member 34 to its extreme right-hand position, and if the vehicle is empty or unloaded, substantially no fluid under pressure will be delivered to chamber 65 and spring 63 will retain the yoke member in the position shown in Fig. 1, and if the vehicle is partially loaded, the yoke member will assume an intermediate position corresponding to the degree of fluid pressure developed in chamber 65 as determined by the load measuring mechanism 8 in accordance with the weight of the load on the vehicle.

Now, let it be assumed that the car is fully loaded and has been set out on a railway siding for unloading. When the car is separated from the train, an emergency application of the brakes is effected by reason of the brake pipe being suddenly opened to atmosphere. The brake controlling valve device operates in response to the emergency reduction thus effected in brake pipe pressure to connect the auxiliary and emergency reservoirs 4 and 5, respectively, to the brake cylinder pipe 17 and thence to the usual pressure chamber 16 in the brake cylinder device 9. Fluid under pressure in pipe 17 will also flow to the load compensating valve device 7 to operate said device to supply fluid to brake cylinder chamber 23 at pressures directly proportional to the pressure of fluid in pipe 17 and inversely proportional to the weight of the load on the vehicle as fully described in the aforementioned copending application. Under the presently assumed fully loaded condition of the car, yoke member 34 will be in direct axial alignment with stem 40 and consequently valve device 7 will not operate to supply fluid under pressure to chamber 23 as explained in detail in the aforesaid application. Fluid under pressure in chamber 16 will be fully effective for providing braking power for braking the fully loaded car.

Upon the venting of fluid under pressure in brake pipe 1 to atmosphere, fluid under pressure in chamber 83 also flows to atmosphere through passage 84 and branch pipe 2. When pressure of fluid in chamber 83 is reduced to approximately ten pounds, for example, spring 86 will be permitted to actuate piston 82 toward the left to the position shown in Fig. 1. In so doing, the catch 115 of the pawl 109 attached to stem 88 of piston 82 will be carried over the next tooth 117 to the left of that just engaged, the spring 110 first permitting counterclockwise rocking of the pawl and after passing the tooth rocking the pawl in a clockwise direction to a position beyond the detent 115 for a subsequent load measuring operation.

Upon movement of valve 97 out of contact with valve member 91, spring 104 actuates said valve member to the left into contact with ring 105 as shown in Fig. 2.

Now, let it be assumed that the car has been unloaded, and that it is desired to release the brakes for moving the car off the railway siding. Fluid under pressure supplied to brake pipe 1 for this purpose flows through branch pipe 2 and weighing mechanism 8 by the route previously described to the weighing pipe 50, whence it flows through passage 50a to chamber 49 in the locking portion 45 of the load compensating valve device 8. When the pressure of fluid thus supplied to chamber 49 slightly exceeds ten pounds, diaphragm 45 deflects outwardly, carrying detent 44 out of locking engagement with yoke member 34, thereby permitting spring 63 to return said yoke member to the position shown in Fig. 1.

Fluid under pressure supplied to brake pipe 1 also flows through branch pipe 2 to chamber 83 by way of passage 84 in weighing mechanism 8, where it acts upon piston 82 to urge said piston toward its innermost position initially against the force of spring 86 and then in addition against a portion of the weight of the now unloaded car body acting downwardly through the upper plate 128 to urge rack 118 to rotate in a counterclockwise direction against movement of pawl 109 in an inward direction. In the embodiment shown it is preferred that a pressure of approximately fifteen pounds in chamber 83 be sufficient to prevail over the opposing forces exerted by spring 86 and the weight of the car body transmitted to rack 118. In response to a sufficient pressure of fluid in chamber 83, piston 82 moves to its innermost position in which the flow of fluid under pressure from branch pipe 2 to weighing pipe 50 is cut-off by valve 97 seating on valve seat 98 and by valve seat 101 engaging gasket 102 as previously described.

The subsequent rise in pressure of fluid supplied to branch pipe 2 operates cut-off valve device 77 to vent fluid under pressure retained in pipe 50 to atmosphere through passage 69, pipe 78 and said device. When pressure of fluid supplied to connected chamber 76 is not sufficient to maintain sealing contact between diaphragm 74 and valve 79, fluid under pressure supplied to chamber 65 is dissipated to atmosphere through port 73. With fluid in pipe 50 at atmospheric pressure, locking portion 45 operates to lock yoke member 34 in its empty position shown in Fig. 1.

Upon a service reduction in brake pipe pressure, brake controlling valve device 3 operates to supply fluid under pressure from auxiliary reservoir 4 through brake cylinder pipe 17 to pressure chamber 16 in brake cylinder device 9 for the purpose of establishing a braking force. Fluid under pressure in brake cylinder pipe 17 also flows to load compensating valve device 7, where it operates control stem 40 to rock struts 35 in a clockwise direction about shaft 36. As described in the aforesaid application, this action of stem 40 actuates stem 41 outwardly, thereby operating a valve mechanism (not shown) to supply fluid under pressure from supply reservoir 6 by way of pipe 137 to pipe 26 leading to load compensating chamber 23 in brake cylinder device 9 to establish a force opposing that exerted by fluid pressure in main pressure chamber 16. In response to the pressure of fluid supplied to pipe 26, stem 41 urges struts 35 to rock in a counterclockwise direction about shafts 36 until, with approximately the same pressure in pipe 26 and chamber 23 as in pipe 17 and chamber 16, the struts are returned to their balanced position in which they are shown in Fig. 1. The braking force exerted by piston 15 is thus reduced to that necessary for braking an empty vehicle.

*Summary*

From the foregoing description it will be seen that I have provided, in a load compensating brake apparatus for a railway vehicle, a weighing mechanism directly responsive to the weight of the load carried by the vehicle, regardless of the spring conditions or position of the trucks of the vehicle, to supply fluid at corresponding degrees of pressure to a load compensating valve device which is responsive thereto to vary the braking power according to the weight of the load on the vehicle.

Having now described my invention, what I claim as new and desire to secure by Letters Patent, is:

1. A weighing mechanism for a load compensating vehicle brake apparatus having a brake pipe and a weighing pipe in which pressure of fluid is adapted to be varied according to the load on said vehicle, said mechanism comprising valve means having an open position for establishing communication between said brake pipe and said weighing pipe and a closed position for closing said communication, piston means operative in response to brake pipe pressure to move said valve means to said closed position, resilient means acting on said piston means in opposition to brake pipe pressure, cam means responsive to weight of a portion of the load on the vehicle to bias said piston means against brake pipe pressure and comprising an annular rotary plate having a series of identical cam surfaces arranged in a concentric circle on one face and a series of teeth arranged in a concentric circle about its periphery, the spacing between adjacent pairs of said teeth being equivalent to twice the spacing between similar points on two adjacent cam surfaces, bearing means adapted to transfer a part of the weight of the vehicle load to said cam surfaces, and pawl means operatively connecting said piston means to said teeth and operative by said piston means as said piston moves said valve means from said open position to said closed position, to move said plate a peripheral distance equal to the space between an adjacent pair of said teeth.

2. A weighing mechanism for a load compensating vehicle brake apparatus having a brake pipe and a weighing pipe in which pressure of fluid is adapted to be varied according to the load on said vehicle, said mechanism comprising valve means having an open position for establishing communication between said brake pipe and said weighing pipe and a closed position for closing said communication, piston means operative in response to brake pipe pressure to move said valve means to said closed position, resilient means acting on said piston means in opposition to brake pipe pressure, cam means responsive to weight of a portion of the load on the vehicle to bias said piston means against brake pipe pressure and comprising an annular rotary plate having a series of identical cam surfaces arranged in a concentric circle on one face and a series of teeth arranged in a concentric circle about its periphery, the spacing between adjacent pairs of said teeth being equivalent to twice the spacing between similar points on two adjacent cam surfaces, bearing means adapted to support the vehicle load in part and to traverse said cam surfaces under said load, and pawl means operatively connecting said piston means to said teeth and operative by said piston means as said piston means moves said valve means from said open position to said closed position to move said plate a peripheral distance equal to the space between an adjacent pair of said teeth.

3. A weighing mechanism for a load compensating vehicle brake apparatus having a brake pipe and a weighing pipe in which pressure of fluid is adapted to be varied according to the load on said vehicle, said mechanism comprising valve means having an open position for establishing communication between said brake pipe and said weighing pipe and a closed position for closing said communication, piston means operative in response to brake pipe pressure to move said valve means to said closed position, resilient means acting on said piston means in opposition to brake pipe pressure, cam means responsive to weight of a portion of the load on the vehicle to bias said piston means against brake pipe pressure and comprising a non-rotating displaceable plate subject to a portion of the weight of the load on the vehicle, a rotary rack plate disposed in spaced, coaxial, and parallel relationship to said non-rotating plate, at least one of the adjacent surfaces of said plates having a series of identical inclined surfaces arranged in a concentric circle, bearing means interposed between said plates for traversing one of said cam surfaces during rotation of said rack plate, and pawl means carried by said piston means and operative thereby to engage and rotate said rack plate the distance of at least one cam surface as said piston means moves said valve means from said open position to said closed position.

References Cited in the file of this patent

UNITED STATES PATENTS

| Number | Name | Date |
| --- | --- | --- |
| 788,112 | Mason | Apr. 25, 1905 |
| 976,000 | Schenck | Nov. 15, 1910 |
| 1,000,593 | Forney et al. | Aug. 15, 1911 |
| 1,922,227 | Brecht | Aug. 15, 1933 |
| 2,534,622 | Pickert | Dec. 19, 1950 |